(No Model.)
E. FEUERHERD.
POT FOR PRESERVING PROVISIONS ON ICE.
No. 509,572. Patented Nov. 28, 1893.
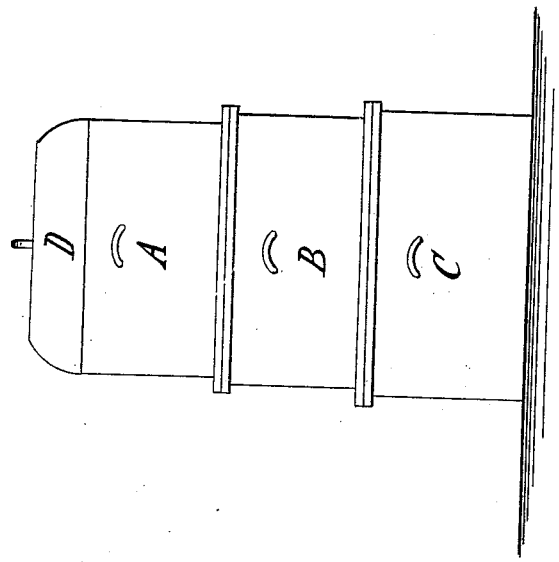
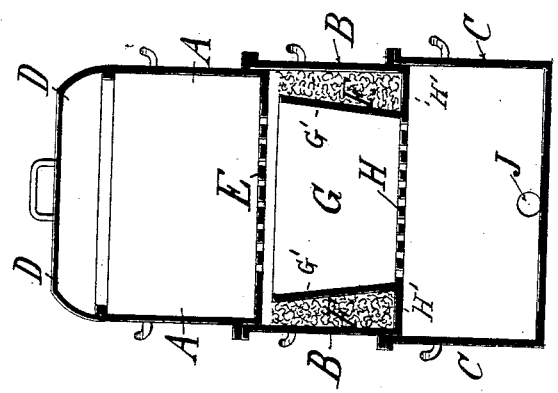
WITNESSES:
Wm. Schulz
A. Jonghmans
INVENTOR
Emma Feuerherd
BY Roeder & Briesen
ATTORNEYS.
THE NATIONAL LITHOGRAPHING COMPANY,
WASHINGTON, D. C.

UNITED STATES PATENT OFFICE.

EMMA FEUERHERD, OF COSWIG, GERMANY.

POT FOR PRESERVING PROVISIONS ON ICE.

SPECIFICATION forming part of Letters Patent No. 509,572, dated November 28, 1893.

Application filed July 8, 1893. Serial No. 479,866. (No model.)

*To all whom it may concern:*

Be it known that I, EMMA FEUERHERD, a subject of the Duke of Anhalt, residing in the city of Coswig, in the Duchy of Anhalt, Empire of Germany, have invented an Improved Pot for Preserving Provisions on Ice, of which the following is a specification.

This invention relates to an ice pot or refrigerating vessel, the arrangement of which renders it possible to preserve provisions for a long time and with great economy of ice.

It consists in certain features of construction and in combination of parts, hereinafter described and pointed out in the claim.

In the accompanying drawings, Figure 1, is a longitudinal section of the refrigerating vessel; Fig. 2 a side elevation of the same.

A, is the top receptacle.
B, is the central receptacle.
C, is the undermost receptacle.
D is the cover of the top receptacle.
E is the sieve bottom of top receptacle.
F, is the space occupied by the non-conductor.
G is the ice receptacle.
H is the sieve bottom of the chamber G.
J is the outlet for the melted ice water.

The ice pot consists of three pots A, B, C, fitted one above the other and made of earthenware, glass, china or stoneware. The top vessel A, is provided with a cover D, to exclude the air. This top receptacle is used for the reception of provisions and is provided with a sieve bottom E, in order that the eatables therein preserved may be exposed as much as possible to the cooling effect of the ice, without being brought into direct contact therewith. The middle receptacle B, which is divided into two round concentric chambers G, and F, by a circular wall G', rests on the undermost receptacle C. While the middle chamber G, of the receptacle B, receives the ice and is provided with a perforated bottom H, the space F, around it, is intended for the reception of a non-conductor, such as fossil-meal and has a solid bottom H'. The water which flows through the perforated bottom H, of the ice chamber G, is collected by the lowermost pot C, and can be discharged at will through the outlet J.

The device is very simple and comparatively inexpensive.

What I claim is—

The combination of uppermost pot A, having perforated bottom E, with central part B, having bottom H, which is centrally perforated and has an upwardly projecting partition G', and with a lowermost pot C, substantially as specified.

Signed at Magdeburg, Germany, this 19th day of June, 1893.

EMMA FEUERHERD.

Witnesses:
    JOHANNES OELTZE,
    WILHELM BISCHOFF.